(12) United States Patent
Price

(10) Patent No.: US 6,673,845 B2
(45) Date of Patent: Jan. 6, 2004

(54) PRODUCTION OF HYDROCARBON PRODUCTS

(75) Inventor: Julian Graham Price, Vanderbijlpark (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 157 days.

(21) Appl. No.: 10/060,961

(22) Filed: Jan. 30, 2002

(65) Prior Publication Data

US 2002/0115731 A1 Aug. 22, 2002

(30) Foreign Application Priority Data

Feb. 1, 2001 (ZA) .......................................... 2001/0909

(51) Int. Cl.[7] .............................. C07C 27/00; F02C 3/00
(52) U.S. Cl. ...................... 518/700; 518/702; 518/712; 60/39.01; 60/39.02
(58) Field of Search ................................ 518/700, 702, 518/712; 60/39.01, 39.02

(56) References Cited

U.S. PATENT DOCUMENTS

| | | | |
|---|---|---|---|
| 3,986,349 A | 10/1976 | Egan | 60/39.02 |
| 4,092,825 A | 6/1978 | Egan | 60/39.02 |
| 4,333,310 A | 6/1982 | Uram | 60/39.18 B |
| 4,594,140 A | 6/1986 | Cheng | 208/414 |
| 5,733,941 A | 3/1998 | Waycuilis | 518/703 |
| 6,180,684 B1 | 1/2001 | Halmo et al. | 518/705 |
| 6,248,794 B1 | 6/2001 | Gieskes | 518/700 |

FOREIGN PATENT DOCUMENTS

| | | |
|---|---|---|
| EP | 0336378 | 10/1989 |
| EP | 0605156 | 7/1994 |
| EP | 0930268 | 7/1999 |
| WO | 9801514 | 1/1998 |
| WO | 9836038 | 8/1998 |
| WO | 0102322 | 1/2001 |
| WO | 0204387 | 1/2002 |

*Primary Examiner*—J. Parsa
(74) *Attorney, Agent, or Firm*—Ladas & Parry

(57) ABSTRACT

An integrated process for producing hydrocarbon products and energy includes reforming a hydrocarbonaceous gaseous feed stock to synthesis gas, and exothermally reacting the synthesis gas at elevated temperature and pressure, and in the presence of a Fischer-Tropsch catalyst, to produce a range of hydrocarbon products of differing carbon chain lengths. The reaction temperature is controlled by indirect heat exchange of a reaction medium, comprising synthesis gas and hydrocarbon products, with water, with the water being converted to steam ('FT steam'). The process includes burning a combustible gas in a combustion chamber of a gas turbine generator, to form combusted gas, and expanding the combusted gas through an expansion chamber of the gas turbine generator to form hot flue gas. The gas turbine generator generates electrical energy. The FT steam is superheated by means of hot flue gas, thereby producing superheated FT steam.

20 Claims, 1 Drawing Sheet

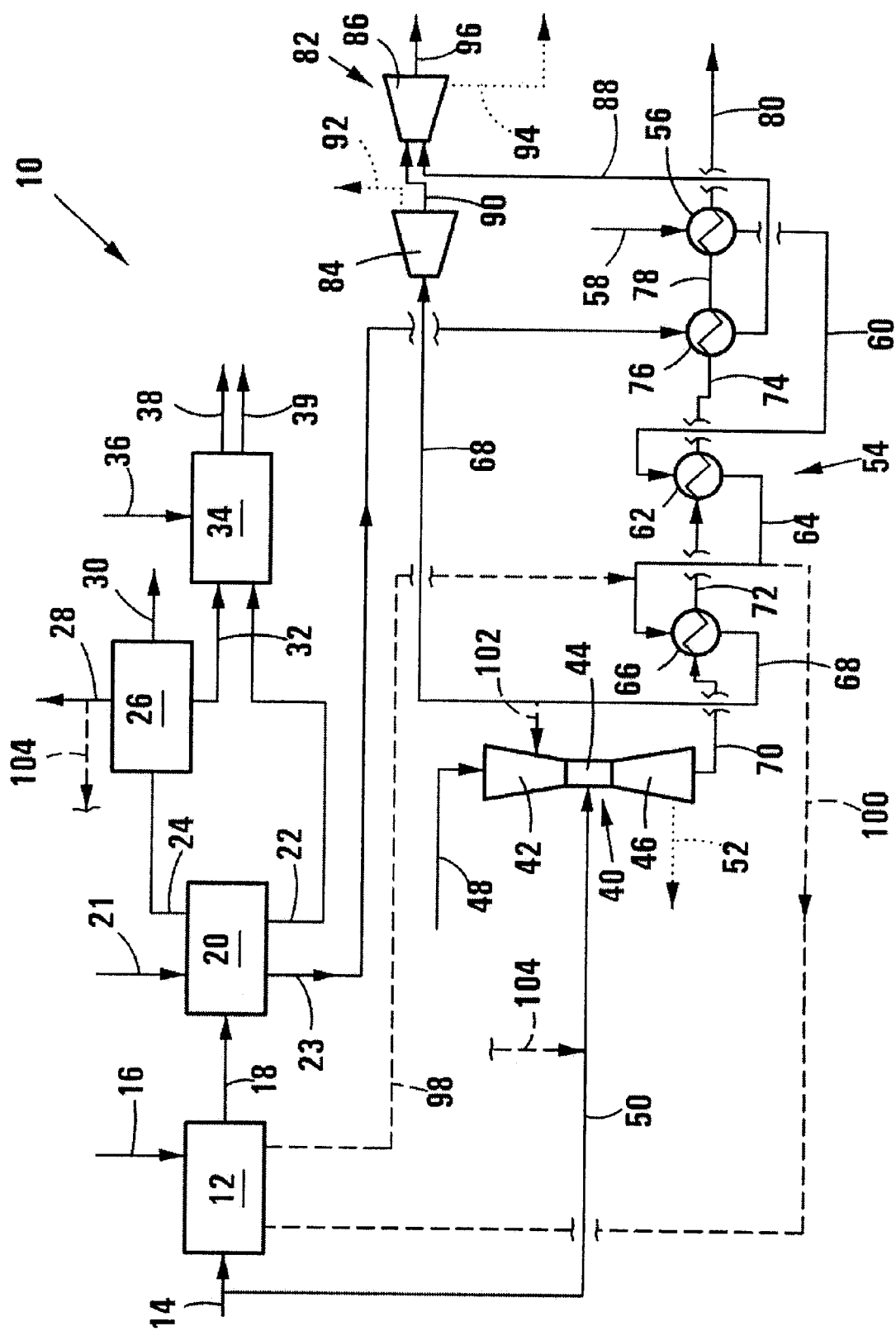

PRODUCTION OF HYDROCARBON PRODUCTS

THIS INVENTION relates to the production of hydrocarbon products. It relates in particular to an integrated process for producing hydrocarbon products and energy.

According to a first aspect of the invention, there is provided an integrated process for producing hydrocarbon products and energy, which process includes reforming a hydrocarbonaceous gaseous feedstock to synthesis gas;

exothermally reacting the synthesis gas at elevated temperature and pressure, and in the presence of a Fischer-Tropsch catalyst, to produce a range of hydrocarbon products of differing carbon chain lengths:

controlling the reaction temperature by indirect heat exchange of a reaction medium, comprising synthesis gas and hydrocarbon products, with water, with the water being converted to steam ('FT steam');

burning a combustible gas in a combustion chamber of a gas turbine generator, to form combusted gas, and expanding the combusted gas through an expansion chamber of the gas turbine generator to form hot flue gas, while generating electrical energy by means of the gas turbine generator; and superheating at least some of the FT steam by means of at least some of the hot flue gas, thereby producing superheated FT steam.

The FT steam may be at a medium pressure between about 800 kPa(a) and about 3000 kPa(a)

The reforming of the hydrocarbonaceous gaseous feedstock to synthesis gas may be effected in a synthesis gas production stage. The synthesis gas comprises at least CO, $H_2$ and $CO_2$, and is at an elevated temperature.

The process may then include, prior to reacting the synthesis gas, cooling the synthesis gas by indirect heat exchange with water, with the water being converted to steam ('Syngas steam').

The process may also include feeding the cooled synthesis gas, as a feedstock, to a hydrocarbon synthesis stage in which the exothermal Fischer-Tropsch reaction of the synthesis gas is effected. A vapour phase comprising light hydrocarbon products and unreacted synthesis gas, a liquid phase comprising heavier liquid hydrocarbon product, and an aqueous phase comprising water and any soluble organic compounds formed during the reaction of the synthesis gas, may be produced in the hydrocarbon synthesis stage. The vapour phase, the liquid phase and the aqueous phase may then be withdrawn from the hydrocarbon synthesis stage.

The gas turbine generator constitutes, or forms part of, an electricity generation stage. The hot flue gas is thus withdrawn from the electricity generation stage.

The superheating of the FT steam may thus be effected in a heat exchange stage. If desired, high pressure steam ('HP steam') having a pressure between 3000 kPa(a) and 12000 kPa(a) may also be generated in the heat exchange stage by means of hot flue gas. The HP steam may, if desired, be superheated. When HP steam is generated, a portion thereof may, if desired, be used a process steam in the hydrocarbon synthesis stage.

The process may include feeding at least some of the superheated FT steam into an energy generation stage, which may comprise a steam turbine. The superheated FT steam is then directed into the steam turbine which thereby generates electrical and/or mechanical energy.

Thus, according to a second aspect of the invention, there is provided an integrated process for producing hydrocarbon products and energy, which process Includes in a synthesis gas production stage, reforming a hydrocarbonaceous gaseous feedstock to synthesis gas comprising at least CO, $H_2$ and $CO_2$, with the synthesis gas being at elevated temperature, and cooling the synthesis gas by indirect heat exchange with water, with the water being converted to steam ('Syngas steam'):

feeding tho cooled synthesis gas, as a feedstock, to a hydrocarbon synthesis stage;

in the hydrocarbon synthesis stage, exothermally reacting the synthesis gas at elevated temperature and pressure, and in the presence of a Fischer-Tropsch catalyst, to produce a range of hydrocarbon products of differing carbon chain length; controlling the reaction temperature by indirect heat exchange of a reaction medium comprising the synthesis gas feedstock and the hydrocarbon products with waters with the water being converted to steam ('FT steam'); and producing a vapour phase comprising light hydrocarbon products and unreacted synthesis gas, a liquid phase comprising heavier liquid hydrocarbon products, and an aqueous phase comprising water and any soluble organic compounds formed during the reaction of the synthesis gas;

withdrawing the vapour phase, the liquid phase and the aqueous phase from the hydrocarbon synthesis stage;

in an electricity generation stage comprising a gas turbine generator, burning a combustible gas in a combustion zone or chamber of the gas turbine generator, to form combusted gas, and expanding the combusted gas through an expansion chamber of the gas turbine generator to obtain hot flue gas, with electrical energy being generated by the gas turbine generator;

withdrawing the hot flue gas from the electricity generation stage;

in a heat exchange stage, using the hot flue gas to superheat at least some of the FT steam and/or to generate high pressure steam ('HP steam') having a pressure between 3000 kPa(a) and 12000 kPa(a) and, optionally, superheating the HP stream;

feeding at least some of the superheated steam into an energy generation stage comprising, for example, a steam turbine;

when the HP steam is generated, optionally using a portion thereof as process steam in the hydrocarbon synthesis stage;

in the energy generation stage, generating electrical and/or mechanical energy by meant of the steam turbine into which the superheated steam is directed.

The reforming of the hydrocarbonaceous gas, ie of the hydrocarbonaceous gaseous feedstock, to synthesis gas is thus effected by reacting the hydrocarbonaceous gas with steam and/or oxygen at high temperature, ie high temperature reforming is employed. Typically, the conversion may be effected by means of steam reforming, which does not require the use of oxygen, autothermal reforming, in which the hydrocarbonaceous material reacts with oxygen in a first reaction section, whereafter an endothermic steam reforming reaction takes place adiabatically in a second reaction section; ceramic oxygen transfer membrane reforming, in which oxygen required for the reforming reaction is transported through an oxygen permeable membrane into a reaction zone; plasma reforming in which the reforming reaction is driven by an electrically generated plasma; non-catalytic partial oxidation; or catalytic partial oxidation. If desired, two or more of these conversion mechanisms or technologies may be combined, eg to optimize thermal efficiency, or to obtain an optimized or beneficial synthesis gas composition. A lower temperature prereforming step may be employed before the high temperature reforming takes place, and is particularly useful for preventing carbon formation by thermal decomposition when higher carbon number hydrocarbons are present in the feedstock.

The hydrocarbonaceous gaseous feedstock may, in particular, be natural gas, or a gas found in association with crude oil, and which comprises mainly $CH_4$ and other hydrocarbons. An initial cooling step may be used to knock out condensable hydrocarbons prior to the gas being subjected to the reforming. The synthesis gas will then contain, in addition to CO, $H_2$ and $CO_2$, also some unreacted $CH_4$ and inert gases.

The oxygen may be obtained from a cryogenic air separation plant in which air is compressed and separated cryogenically into oxygen and is nitrogen. At least a portion of the electrical energy and/or the mechanical energy produced in the electricity generation stage and/or in the energy generation stage, may be used as a power source for said cryogenic air separation plant.

The process may include preheating the hydrocarbonaceous gaseous feedstock prior to feeding it into the reformer. Typically, it may be preheated then in excess of 400° C. The preheating may be affected in a gas fired furnace, which may be fired using a portion of the hydrocarbonaceous gas and/or a portion of the vapour phase produced in the hydrocarbon synthesis stage.

The synthesis gas produced in the synthesis gas production stage is typically at an elevated temperature in excess of 800° C., and the generation of the Syngas steam using the hot synthesis gas may be effected in a heat recovery unit. The Syngas steam may also be at a high pressure between about 3000 kPa(a) and about 12000 kPa(a).

The Syngas steam may be used in the process, eg where applicable, as a reactant in the reforming reaction; for heating and/or in a steam turbine to produce electrical and/or mechanical energy for driving compressors such as an air compressor in the cryogenic air separation plant and for driving pumps and other equipment. However, in one embodiment of the invention, at least a portion of the Syngas steam may be converted to superheated steam by heat exchange with hot flue gas from the electricity generation stage, as described in more detail hereinafter.

As indicated hereinbefore, at least a portion of the Syngas steam may be used in a steam turbine. It is well known from engineering practice that higher efficiencies can be obtained in steam turbines if the steam employed therein has a certain degree of superheat. Superheated high pressure steam may be generated by heat exchange of the Syngas steam with the hot synthesis gas but this results in less steam in total being produced from the anthalpy in the synthesis gas. Such process superheaters are also expensive due to the non-standard materials of construction required to avoid metal dusting. Thus, the superheating may be done externally using a gas fired furnace, such as the furnace used for preheating the gas feedstock to the synthesis gas production stage.

In the hydrocarbon synthesis stage, the hydrocarbon products produced have chain lengths varying from 1 carbon atom to over 100 carbon atoms. The hydrocarbon synthesis stage may include a suitable reactor such as a tubular fixed bed reactor, a fluidised bed reactor, a slurry bed reactor or an emulating bed reactor, in which the hydrocarbon products are produced. The pressure in the reactor may be between 1000 and 10000 kPa. The reactor will thus contain the Fischer-Tropsch catalyst, which will be in particulate form. The catalyst may contain, as its active catalyst component, one or more of Fe, Co, Ni, Ru, Re and/or Rh.

As indicated hereinbefore, the reaction, ie the Fischer-Tropsch reaction, is exothermic, and occurs at a temperature between 200° C. and 380° C. The reactor temperature is controlled, eg the reactor may be maintained at near-isothermal condition, by passing water as a cooling medium through the reactor, with the water thus being converted into the FT steam and thereby removing the heat of reaction. For a tubular fixed bed reactor, the water usually passes on the shell side of the reactor, while the hydrocarbon synthesis occurs inside the tubes. For the other types of reactors, coils are normally located inside the reactor, with the water passing through the coils. Although the pressure of the FT steam that is generated can vary depending on the desired temperature of the hydrocarbon synthesis reaction, the FT steam so produced is typically at a lower pressure than the Syngas steam. The FT steam is thus typically at medium pressure, is at a pressure between about 800 kPa(a) and about 3000 kPa(a), as hereinbefore described.

In accordance with the Fischer-Tropsch reaction, CO and $H_2$ are converted into hydrocarbon products according to the following generalised formula 1);

$$nCO+(2n+1)H_2 \rightarrow CnH_{2n+2}+nH_2O \qquad (1)$$

As indicated hereinbefore, the Fischer-Tropsch reaction takes place at a temperature between 200° C. and 380° C., typically between 200° C. and 350° C. Lower temperature operation (200° C. to 300° C.) results in longer chain hydrocarbon formation containing varying quantities of olefins, alcohols and paraffinic compounds, and typically is effected in a fixed bed or bubble column/slurry bed reactor. Higher temperature operation (300° C. to 350° C.) produces a lighter product spectrum and more typically is effected in a fluidized bed reactor.

In all cases, the reaction is highly exothermic, with an approximate heat of reaction of 165 kJ/kmol of CO converted. In order to keep conditions in the reactor close to isothermal, heat must be removed from the reactor by heat exchange with the water and the generation of FT steam as hereinbefore described.

The process may include withdrawing the liquid phase and an overheads vapour phase separately from the reactor, feeding the overheads vapour phase into a product condensation unit, and withdrawing the vapour phase, the aqueous phase, and a condensed product phase, from the product condensation unit.

In the electricity generation stage, the combustible gas that is burned in the combustion chamber of the gas turbine generator may comprise a hydrocarbon gas component admixed with an oxygen containing gas. The hydrocarbon gas component may comprise the same hydrocarbonaceous gas as Is used as feedstock to the synthesis gas production stage, at least a portion of the vapour phase produced in the hydrocarbon synthesis stage, or mixtures thereof. The oxygen containing gas may be air, which may be compressed before it is admixed with the hydrocarbon gas component.

At least a portion of the vapour phase may thus be routed to the gas turbine generator as the hydrocarbon gas component, or as part of the hydrocarbon gas component. However, the process may instead, or additionally, include recycling at least a portion of the vapour phase to the synthesis gas production stage, so that it forms part of the hydrocarbonaceous gaseous feedstock to the synthesis gas production stage. Instead, or additionally, at least a portion of the vapour phase may be recycled to the hydrocarbon synthesis stage, so that it forms, together with the synthesis gas, the feedstock to the hydrocarbon synthesis stage. If desired, at least part of the vapour phase, for example any residual part thereof not required in the gas turbine generator or in the synthesis gas production stage or in the hydrocarbon synthesis stage, may be used as fuel gas in a fuel gas fired furnace, or used as a fuel gas in a power generation stage.

If desired, the aqueous phase may be treated further, to recover any organic components present therein.

The process may include feeding the liquid phase to a product work-up stage. In the product work-up stage, liquid hydrocarbon products may be upgraded by reaction with hydrogen at elevated temperature and pressure, to produce primarily diesel and naphtha hydrocarbon species. More specifically, in the product work-up stage, unsaturated hydrocarbons and oxygen components may be hydrogenated, in a single reactor or in a series of reactors, by reaction with hydrogen, while heavier hydrocarbon fractions may be cracked and isomerised. The product of the hydrotreatment reactor(s) may be sent to a series of distillation columns for separation into various fractions, such as naphtha, diesel and lubricating oil fractions.

Instead of subjecting the liquid phase to hydroprocessing, paraffins, olefin and/or alcohols may be extracted therefrom and subjected to further processing to produce a variety of chemical products therefrom. Instead, or additionally, the liquid phase may be subjected to catalytic reforming/platforming or fluidised catalytic cracking to convert the hydrocarbon products into aromatics and gasoline components.

In yet another version of the invention, the liquid fraction need not be subjected to further work-up, eg when it is in the form of a synthetic crude fuel. Such a crude fuel can then be mixed with crude oil, and subjected to processing as bulk crude oil in an oil refinery.

In the heat exchange stage, both HP steam, and medium pressure steam, ie steam at a pressure between 800 kPa(a) and 3000 kPa(a) (hereinafter also referred to as 'MP steam'), may be produced. Either the HP steam or the MP steam, or both, may be superheated.

The steam turbine of the energy generation stage may be a two (or more) stage steam turbine generator. Superheated HP steam may be directed into a first stage of the generator, where it is expanded to a lower pressure, with this steam then being directed, together with superheated MP steam, into a second stage of the generator. In both stages of the steam generator, electrical and/or mechanical energy is thus generated. The superheated HP steam is thus, in the first stage expanded to about the same pressure as the superheated MP steam. The combined steam stream is, in the second stage, expanded to a suitable pressure, and may then be condensed or directed to a third lower pressure stage.

The process may, in one embodiment of the invention, include superheating the FT steam in the heat exchange stage, ie a by indirect heat exchange with hot flue gas. Thus, in this embodiment of the invention, none of the Syngas steam is superheated in the heat exchange stage In one version, only the FT steam may then be converted into the superheated MP steam used in the second stage of the steam turbine generator, with no additional MP steam being produced from boiler feed water (hereinafter referred to as 'BFW'), ie none of the BFW is converted into superheated MP steam, with only HP steam being generated from additional BFW in the power generation flue gas heat recovery unit; however, in another version, some of the BFW may also be converted to superheated MP steam. The MP steam generated from the BFW by heat exchange with flue gas and the FT steam may then be mixed together prior to being superheated; however, instead, they may be superheated separately and then combined, before being directed into the second stage of the steam turbine generator.

However, in another embodiment of the invention, the process may include superheating a portion of the Syngas steam in the heat exchange stage, ie by heat exchange with hot flue gas, in addition to, or instead of, superheating the FT steam. Typically, all of the Syngas steam can then be superheated in the heat exchange stage. This avoids the necessity of having to superheat the Syngas steam in a separate fuel gas fired furnace. The fuel gas can instead, if desired, be used as a portion of the hydrocarbon gas component in the gas turbine generator. Instead, the fuel gas can be used for supplemental firing in the heat exchange stage to generate the superheated Syngas steam. For example, this supplemental firing may be effected in a convective section of an exhaust of the gas turbine, which thus constitutes a portion of the heat exchange stage.

The Syngas steam may be mixed with HP steam produced from BFW in the heat exchange stage, and the resultant combined HP steam stream then superheated in the heat exchange stage.

The process may include using a portion of the superheated HP steam to drive the air compressor of the gas turbine generator, while the remainder of the superheated HP steam if directed to the steam turbine generator. Instead, however, all of the superheated HP steam may be directed into the steam turbine generator.

If desired, preheating of the feedstock to the synthesis gas production stage can be effected in the convective section of the gas turbine generator exhaust, using hot flue gas, instead of in a separate gas fired furnace.

In yet another embodiment of the invention, the HP steam may be split, with a first portion thereof being directed, after superheating thereof, to the first stage of the steam turbine generator, as hereinbefore described, while a second portion thereof is routed to the synthesis gas production stage, where it is mixed with the Syngas steam. The mixed high pressure steam stream may then be used as process steam so that it is used in the reforming reaction. This is an efficacious approach in the event that insufficient high pressure steam is generated solely in the waste heat recovery section of the reformer for all process requirements. Such a case may exist for instance when steam reforming alone or a combination of reforming techniques is employed. For example, in a first step, endothermic steam reforming may take place, while in a second step oxygen burning autothermal reforming may occur. Steam reforming typically employs a steam/reformable carbon ratio of greater than 1.5, whereas autothermal reforming typically operates with this ratio below 1.5. A favoured arrangement for this combination of reformers is that the heat available in the autothermal reformer's exit stream is used to supply the necessary energy to drive the endothermic steam reforming reaction that occurs in the steam reforming. This arrangement results in less energy being available in the waste heat recovery section to generate steam and also results in a higher total demand for process steam. Consequently the synthesis gas production stage can become a net consumer of steam. In this embodiment of the invention, the necessary additional steam is thus provided by HP steam.

According to a third aspect to the invention, there is provided an integrated process for producing synthesis gas and energy, which process includes in a synthesis gas production stage, reforming a hydrocarbonaceous gaseous feedstock to a synthesis gas comprising at least CO, $H_2$ and $CO_2$;

in an electricity generation stage comprising a gas turbine generator, burning a combustible gas in a combustion zone or chamber of the gas turbine generator, to form combusted gas, and expanding the combusted gas through an expansion chamber of the gas turbine generator to form hot flue gas, while generating electrical energy by means of the gas turbine generator;

in a heat exchange stage, using hot flue gas from the electricity generation stage to heat water and/or steam to produce high pressure ('HP steam') and/or superheated HP steam having a pressure between 3000 kPa(a) and 12000 kPa(a); and feeding at least a portion of the HP steam to the synthesis gas production stage at process steam.

BRIEF DESCRIPTION OF DRAWING

The invention will now be described in more detail, with reference to the accompanying drawing which shows a simplified flow diagram of an integrated process according to the invention for producing hydrocarbon products and energy.

In the drawing, reference numeral 10 generally indicates the integrated process according to the invention for producing hydrocarbon products and energy.

The process 10 includes a reformer 12 which forms part of a synthesis gas, production stage. A natural gas feed line 14 leads into the reformer 12, as does an oxygen/steam feed line 16. The synthesis gas production stage Includes an indirect heat exchanger (not shown) by means of which synthesis gas produced in the reformer 12 is cooled by heat exchange with water, such as boiler feed water ('BFW'), with Syngas steam, which is typically at a pressure of about 7000 kPa(a) and a temperature of about 285° C., being produced.

A synthesis gas line 18 leads from the reformer 12 to a Fischer-Tropsch reactor 20, which is typically a fixed or slurry bed reactor containing a bad of particulate Fischer-Tropsch catalyst. The reactor 20 is provided with cooling coils (not shown) through which, in use, boiler feed water passes in order to control the temperature in the reactor. A BFW food line 21 leads into the reactor 20 and is connected to the cooling coils via a steam drum, while a FT steam line 23 leads from the steam drum. A liquid phase withdrawal line 22 leads from the Fischer-Tropsch reactor 20, as does an overheads vapour phase withdrawal line 24. The line 24 leads into a product condensation unit 26. A vapour phase withdrawal line 28 leads from the product condensation unit 26, as do an aqueous phase withdrawal line 30 and a condensed product phase withdrawal line 32.

The Fischer-Tropsch reactor 20 and the product condensation unit 28 form part of a hydrocarbon synthesis stage.

The condensed product phase withdrawal line 32 as well as the liquid phase withdrawal line 22 lead into a liquid product work-up stage 34, as does a hydrogen feed line 36. At least two products are split in stage 34, and are withdrawn by means of at least two withdrawal lines 38, 39.

The process 10 includes a gas turbine generator, generally indicated by reference numeral 40. The generator 40 includes an air compressor 42, a combustion chamber 44 and an expansion chamber or turbine expander 46.

An air line 48 leads into the compressor 42, while a natural gas feed line 50 leads from the natural gas feed line 14 into the combustion chamber 44. An electricity withdrawal line 52 leads from the generator 40.

The process 10 also includes a heat exchange stage, generally indicated by reference numeral 54. The heat exchange stage 54 includes a preheater 56 with a BFW line 58 leading into the preheater 56. A hot water transfer line 60 leads from the preheater 56 to a boiler 52 with a saturated HF steam line 64 leading from the boiler 62 to a superheater 86. A superheated HP steam line 88 leads from the superheater 68.

A hot flue gas line 70 leads from the turbine expander 46 of the gas turbine generator 40 into the superheater 66. A flue gas line 72 leads from the superheater 66 to the boiler 62 while a flue gas line 74 leads from the boiler 62 to a superheater 76. A flue gas line 78 leads from the superheater 76 to the preheater 56, with a true gas withdrawal line 80 leading from the preheater 56.

The process 10 still further includes a 2-stage steam turbine, generally indicated by reference numeral 82, which constitutes an energy generation stage. The turbine 82 thus comprises a first stage 84 as well as a second stage 86.

The FT steam line 23 leads into the superheater 76, with a superheated MP steam line. 88 leading from the superheater 76 to the second stage 86 of the steam turbine 82.

The superheated HP steam line 68 leads into the first stage 84 of the steam turbine 82, with a steam line 90 leading from the first stage 84 to the second stage 86 of the steam turbine 82.

An electricity withdrawal line 92 leads from the first stage 84 of the steam turbine 82, while an electricity withdrawal line 94 leads from the second stage 86 thereof. A steam condensate withdrawal line 96 leads from the second stage 86 of the steam turbine In use, natural gas which enters the reformer 12 along the line 14, is reformed by reacting it with oxygen and steam which enters the reformer 12 along the line 16, to produce synthesis gas comprising CO, $H_2$ and $CO_2$ with the synthesis gas being at elevated temperature, eg typically at above 800° C. The natural gas is preheated (not shown) to about 500° C. in a gas fired furnace. The hot synthesis gas is cooled, by indirect heat exchange with BFW, with the generation of the Syngas steam.

The synthesis gas is transferred along the line 18 into the Fischer-Tropsch reactor 20 where it is exothermally reacted at a temperature of 200° C. to 250° C. and at a pressure of about 2500 kPa(a), in the presence of the particulate Fischer-Tropsch catalyst, to produce a range of hydrocarbon products to differing carbon Chain lengths. The reactor 20 is controlled at near isothermal conditions by means of BFW which enters through the BFW flow line 21, passes through cooling coils provided inside the reactor 20, and is converted into saturated FT steam which is withdrawn along the flow line 23. The FT steam is typically at a pressure of about 1200 kPa(a) and a temperature of about 188° C.

A liquid phase comprising heavier liquid hydrocarbon products is withdrawn from the reactor 20 along the line 22, and fed into the product work-up stage 34 where it is reacted with hydrogen, which enters along the flow line 36, to form more desirable products such as gasoline and diesel species. Those are withdrawn from the work-up stage 34 along the line 38.

An overheads vapour phase is withdrawn from the reactor 20 along the line 24 and fed into the product condensation unit 26. A vapour phase is withdrawn from the unit 26 along the flow line 28, while an aqueous phase comprising water and any soluble organic compounds formed during the reaction of the synthesis gas in the reactor 20, is withdrawn along the line 30. Light hydrocarbon products, typically having 3 or more carbon atoms, also condense out in the unit 26 and are withdrawn along the line 32 and fed into the product work-up stage 34, Air enters the compressor 42 of the gas turbine generator 40 along the line 48. The air is compressed and than posses into the combustion chamber 44 where it is mixed with natural gas which enters the chamber 44 along the line 50. The hydrocarbons present in the natural gas and the oxygen present in the air, react exothermally in the combustion chamber 44, and the resultant hot flue gas passes into the turbine expander 46 where it is expanded through a series of turbine blades with the attendant production of electricity which is withdrawn along the line 52.

The hot flue gas passes sequentially through the superheater 66, the boiler 62, the superheater 76 and the preheater 56, with spent flue gas being withdrawn along the line 80.

In the preheater 56, the flue gas preheats BFW which enters the preheater 56 along the flow line 58, with hot water passing from the preheater 56, along the line 60, into the boiler 62. In the boiler 62, saturated HP steam, which is at a pressure of about 7000 kPa(a) and a temperature of about 285° C. is produced, and passes along the flow line 64 into the superheater 86 where it is superheated to about 450° C. The superheated HP steam passes from the superheater 66 into the first stage 84 of the steam turbine 82.

The BFW entering the preheater 56 is at an appropriate pressure, typically above 7000 kPa(a). The BFW thus passes counter-currently through the various heat exchangers, relative to the flue gas.

In the first stage 84 of the steam turbine 82, electricity is generated and is withdrawn along that line 92, while the HP steam is expanded into medium pressure steam.

The FT steam produced in the reactor 20 passes along the flow line 23 into the superheater 76 in which the saturated FT steam is superheated to about 250° C. The superheated FT steam from the superheater 76 passes, along the line 88, into the second stage 86 of the steam turbine, together with the medium pressure steam from the first stage 84. In the second stage 86, the medium pressure steam is expanded further to produce additional electricity, which is withdrawn along the line 94. Steam condensate is withdrawn along the line 96 and calm naturally be condensed and recycled as boiler feed water.

In another embodiment of the invention, at least a portion of the Syngas steam generated in the reformer 12 may pass along a flow line 98, and mixed with saturated HP steam from the boiler 82, with the line 98 thus entering the line 64. In this embodiment, some of the steam produced in the reformer 12 is thus used, after being superheated, to generate electricity in the turbine 82.

In another embodiment of the invention, saturated HP steam produced in the boiler 62 can be split, with one portion being routed to the steam turbine 82 along the line 64, the superheater 66 and the line 68. A second portion thereof ban then pass, along a line 100, to the reformer 12, where it can't be used as process steam in the reforming reaction.

If desired, a portion of the superheated HP steam produced in the superheater 66 can be used, by means of a flow line 102, to drive the air compressor 42 of tho gas turbine generator 40.

Still further, if desired, a portion of the vapour phase which is withdrawn from the product condensation unit 26 can be used as a feedstock component to the gas turbine generator 40. In such case, it will thus pass along a line 104 which leads into the line 50.

The Applicant is aware that medium pressure steam, ie FT steam, generated in a hydrocarbon synthesis stage of a hydrocarbon production process comprising a synthesis gas production stage and a subsequent hydrocarbon synthesis stage as hereinbefore described, can be used for various heating duties, including heating duty in a reaction water treatment stage used to ensure the water effluent meets environmental regulations. However, much of the FT steam has limited use within the process. Ideally, the FT steam can be exported to neighboring industries, but often such a solution is not feasible due to distances involved or because the steam is not of sufficiently high grade. In such cases the steam can be condensed and reintroduced into the BPW system; however, such options introduce thermal inefficiencies into the process.

Additionally, such FT steam may be used in a steam turbine directly, to generate electrical power or to drive mechanical equipment; however, again such use is inefficient, and the required equipment is expensive.

The Applicant has found that, in a well heat integrated gas to liquids process, the greater proportion of the FT steam has no potential uses within the battery limits of the plant. The higher quality steam, ie the Syngas steam, produced in the synthesis gas production stage, can be used for the majority of the power and mechanical work requirements of the plant. In order to conserve the water balance of the plant, it is necessary to condense the FT steam so that it can be recycled in the plant's BFW system. However, this condensation is expensive and wasteful in terms of the potential energy that exists in the FT steam.

The potential quantity of energy that is available In the FT steam can be as high as between 2 and 3 MW of power per thousand barrels per day of liquid hydrocarbon production. A nearby external power user may potentially be able to use this power. The external user may include a community, a chemical processing facility or refinery or a Liquefied Natural Gas ('LNG') plant.

If the external demand matches the power available by utilizing the FT steam alone, then an optimum solution results. However, it the external demand is greater than that available by utilizing the FT steam alone, then a more optimised solution must be sought.

The Applicant is aware that such optimized solutions include using natural gas or synthesis gas in a gas turbine to generate power. However, although it is thus known to combine power generation with hydrocarbon synthesis, the process of the present invention provides a more efficient manner of doing so. Thus, the process of the present invention provides a more efficient manner of combining power generation and hydrocarbon synthesis in which at least one stream of a suitable grade of steam is transferred between the combined cycle power generation stages 40 and 82 and the hydrocarbon synthesis stage, in the Fischer-Tropsch reactor 20.

It is believed that the process of the present invention has at least the following advantages over known processes.

- The known processes have not identified and appreciated that the intermediate pressure steam generated from an exothermic reaction such as a hydrocarbon synthesis can be beneficially used in a combined cycle power plant to generate efficiently electrical or mechanical energy.
- A known process of which the Applicant is aware has a combined cycle power plant which utilizes the energy in the flue gas from a gas turbine generator to generate a multitude of different grades of steam, ie steam at different pressures, and the different steam grades are then injected into the different stages of a steam turbine. At least two grades of steam, and often three grades of steam, are produced. This is also provided by the present invention, however, the present invention matches the availability of steam from the hydrocarbon synthesis reactor with the availability of heat in the gas turbine flue gas. In the present invention, the intermediate pressure ('MP') process steam is superheated, and an independent MP steam generation stage is thus not required. The superheated MP steam is then injected into the second stage of the 2-stage steam turbine 82. A larger quantity of steam can be generated and superheated in this manner since less energy is required to superheat steam than is required to vaporize water.

The invention will now be further illustrated by way of the following postulated examples. Examples 1 and 2 illustrate drawbacks of known hydrocarbon production processes, while Example 3 illustrates the higher efficiencies achieved with a process according to the invention for producing hydrocarbon products.

EXAMPLE 1

A hydrocarbon synthesis plant converts natural gas into 30000 bpd of liquid hydrocarbon products and produces an additional 150 MW of electrical power using a gas turbine. FT steam from the hydrocarbon synthesis reactor it condensed and not used. The gas turbine includes an air compressor that compresses air to 175 psi a This compressed air is injected together with fuel gas into a combustion chamber where it is ignited. The combusted gas is expanded and cooled through a series of turbine blades. The overall efficiency of the power generation is determined by the equation:

Total power produced (MW)/Total duty of fuel gas consumed (MW)=(Power produced by turbine expander—Power consumed by air compressor)/fuel gas duty.

For the current application, the total efficiency of the power generation is approximately 32%, ie in order to produce 150 MW of electrical power, 469 MW of fuel gas is required.

EXAMPLE 2

A hydrocarbon synthesis plant converts natural gas into 30000 bpd of liquid hydrocarbon products and produces an additional 300 MW of electrical power using steam turbines, A portion of the FT steam (1200 kPa(a)) generated in the synthesis reactors is used for internal processing, leaving 350 t/h for power generation. This is superheated to 250° C. using fuel gas and then expanded in a condensing turbine, 474 t/h of additional steam is generated in a boiler at high pressure (7000 kPa(a)) and superheated to 450° C. It is then expanded in a condensing turbine to produce electrical power.

The boilers for steam generation and superheating are 80% efficient.

The process was calculated to be only 30.6% efficient. In other words, 490 MW of fuel gas is required to produce 150 MW of electrical power.

EXAMPLE 3

A hydrocarbon synthesis plant converts natural gas into 30000 bpd of liquid hydrocarbon products and produces an additional 150 MW of electrical power using the process to this invention.

Fuel gas (which may be unconverted gas and light hydrocarbons from the hydrocarbon synthesis reactor, natural gas, refinery off gas or any combination thereof) is burned in a gas turbine expander and electrical energy is generated. The hot flue gas exiting the turbine is used in a series of heat exchangers to generate superheated HP (7000 kPa(a)) steam. FT steam, ie saturated medium pressure steam from a Fischer-Tropsch hydrocarbon synthesis reactor, is also superheated using waste heat from the flue gas. The superheated HP steam is directed to a two-stage steam turbine. In the first stage the HP steam is expanded to match the pressure of the superheated FT steam. FT steam is then injected into the second stage of the steam turbine along with the expanded steam, 350 t/h of FT steam is available for power generation.

The process was calculated to be 61.0% efficient. In other words, only 246 MW of fuel gas is required to produce 150 MW of electrical power.

What is claimed is:

1. An integrated process for producing hydrocarbon products and energy, which process includes
reforming a hydrocarbonaceous gaseous feedstock to synthesis gas;
exothermally reacting the synthesis gas at elevated temperature and pressure, and in the presence of a Fischer-Tropsch catalyst, to produce a range of hydrocarbon products of differing carbon chain lengths;
controlling the reaction temperature by indirect heat exchange of a reaction medium, comprising synthesis gas and hydrocarbon products, with water, with the water being converted to steam ('FT steam');
burning a combustible gas in a combustion chamber of a gas turbine generator, to form combusted gas, and expanding the combusted gas through an expansion chamber of the gas turbine generator to form hot flue gas, while generating electrical energy by means of the gas turbine generator; and
superheating at least some of the FT steam by means of at least some of the hot flue gas, thereby producing superheated FT steam.

2. An integrated process according to claim 1, wherein the FT steam is at a medium pressure between about 800 kPa(a) and about 3000 kPa(a).

3. An integrated process according to claim 2, which includes feeding at least some of the superheated FT steam into a steam turbine which thereby generates electrical and/or mechanical energy.

4. An integrated process according to claim 3, wherein the steam turbine is a steam turbine generator having at least a high pressure stage ('the first stage'), a lower pressure stage ('the second stage'), and, optionally, at least one further stage which operates at a lower pressure than the second stage.

5. An integrated process according to claim 4, which includes producing, by means of the reaction of the synthesis gas in the presence of the Fischer-Tropsch catalyst, a vapour phase comprising light hydrocarbon products and unreacted synthesis gas, a liquid phase comprising heavier liquid hydrocarbon products, and an aqueous phase comprising water and any soluble organic compounds formed during the reaction of the synthesis gas.

6. An integrated process according to claim 5, which includes, prior to reacting the synthesis gas cooling it by indirect heat exchange with water, with the water being converted to steam ('Syngas steam').

7. An integrated process according to claim 6, wherein the Syngas steam is also at a high pressure between about 3000 kPa(a) and about 12000 kPa(a) and wherein, optionally, at least some of the Syngas steam is also superheated by means of the hot flue gas.

8. An integrated process according to claim 5, wherein the combustible gas that is burned in the combustion chamber of the gas turbine generator comprises a hydrocarbon gas component admixed with an oxygen containing gas.

9. An integrated process according to claim 8, wherein the hydrocarbon gas component comprises the same hydrocarbonaceous gas as that which is reformed to synthesis gas; at least a portion of the vapour phase produced by the reaction of the synthesis gas; or mixtures thereof.

10. An Integrated process according to claim 5, which includes recycling at least a portion of the vapour phase produced by the reaction of the synthesis gas, so that it forms part of the carbonaceous gaseous feedstock that is reformed.

11. An integrated process according to claim 5, which includes recycling at least a portion of tho vapour phase produced by reaction of the synthesis gas, to the synthesis gas so that it forms part of the synthesis gas that is reacted in the presence of the Fischer-Tropsch catalyst.

12. An integrated process according to claim 4, wherein only superheated FT steam is used in the second stage of the steam turbine generator.

13. An integrated process according to claim 4, which includes generating, by means of at least some of the hot flue gas, medium pressure steam ('MP steam') at a pressure between about 800 kPa(a) and about 3000 kPa(a), with this MP steam and the FT steam being mixed together prior to being superheated by means of the hot flue gas and thereafter being directed into the second stage of the steam turbine generator.

14. An integrated process according to claim 4, which includes using at least some of the hot flue gas to heat water and/or steam to produce high pressure ('HP steam') and/or superheated HP steam having a pressure between 3000 kPa(a) and 12000 kPa(a).

15. An integrated process according to claim 14, wherein superheated HP steam is produced, with the process including feeding at least some of the superheated HP steam into the high pressure stage of the steam turbine generator.

16. An integrated process for producing synthesis gas and energy, which process includes in a synthesis gas production stage, reforming a hydrocarbonaceous gaseous feedstock to a synthesis gas comprising at least CO, $H_2$ and $CO_2$;

in an electricity generation stage comprising a gas turbine generator, burning a combustible gas in a combustion zone or chamber of the gas turbine generator, to form combusted gas, and expanding the combusted gas through an expansion chamber of the gas turbine generator to form hot flue gas, while generating electrical energy by means of the gas turbine generator;

in a heat exchange stage, using hot flue gas from the electricity generation stage to heat water and/or steam to produce high pressure ('HP steam') and/or superheated HP steam having a pressure between 3000 kPa(a) and 12000 kPa(a); and feeding at least a portion of the HP steam to the synthesis gas production stage as process steam.

17. An integrated process according to claim 16, wherein superheated HP steam is produced in the heat exchange stage, with the process including feeding at least some of this superheated HP steam into a steam turbine which thereby generates electrical and/or mechanical energy.

18. An integrated process according to claim 17, wherein the steam turbine is a steam turbine generator having at least a high pressure stage ('the first stage'), a lower pressure stage ('the second stage'), and, optionally, at least one further stage which operates at a lower pressure than the second stage.

19. An integrated process according to claim 18, which includes cooling the synthesis gas, which is at elevated temperature, by indirect heat exchange with water, with the water being converted to steam ('Syngas steam') which is at a high pressure between about 3000 kPa(a) and about 12000 kPa(a).

20. An integrated process according to claim 19, which includes mixing at least some of the HP steam with at least some of the Syngas steam, with the resultant combined HP steam stream then being superheated in the heat exchange stage using hot flue gas.

* * * * *